United States Patent [19]

Abbott et al.

[11] Patent Number: 5,024,029

[45] Date of Patent: Jun. 18, 1991

[54] ABRASIVE MEDIA VALVE SYSTEM

[75] Inventors: Kenneth E. Abbott; Patrick J. Lyons, both of Tucson, Ariz.

[73] Assignee: Stripping Technologies Inc., Tucson, Ariz.

[21] Appl. No.: 429,052

[22] Filed: Oct. 30, 1989

Related U.S. Application Data

[63] Continuation-in-part of Ser. No. 253,237, Oct. 4, 1988, Pat. No. 4,901,928.

[51] Int. Cl.$^5$ .............................................. B24C 7/00
[52] U.S. Cl. ........................................ 51/438; 51/436; 51/415; 222/637; 222/75
[58] Field of Search ............... 51/415, 425, 436, 438, 51/319–321, 416, 410; 222/637, 630, 75, 504

[56] References Cited

U.S. PATENT DOCUMENTS

| | | | |
|---|---|---|---|
| 3,070,924 | 1/1963 | Hastrup | 51/438 |
| 3,201,901 | 8/1965 | Pauli | 51/438 |
| 3,359,024 | 12/1967 | Morgan | 51/410 |
| 3,543,444 | 12/1970 | Mehta | 51/438 |
| 4,135,068 | 1/1979 | Burns | 51/436 |
| 4,534,139 | 8/1985 | Desjardins | 51/438 |

FOREIGN PATENT DOCUMENTS 0564656  2/1958  Belgium ............................. 51/436

Primary Examiner—Robert A. Rose
Attorney, Agent, or Firm—Mark E. Ogram

[57] ABSTRACT

A valve system for the finite control of abrasive media within an abrasive blasting environment. Two valves communicate in series: (i) to stop the flow of abrasive media when the deadman switch is deactivated; and (ii) to adjust the flow of abrasive media into the pressurized hose. The flow of abrasive media is controlled through a control panel housed in the blast handle at the blast site and/or through a control panel at the site of the blast generator.

10 Claims, 3 Drawing Sheets

ABRASIVE MEDIA VALVE SYSTEM

BACKGROUND

This is a continuation-in-part of U.S. patent application Ser. No. 07/253,237 entitled "Pressure Hose Handle and System" and filed Oct. 4, 1988 now U.S. Pat. No. 4,901,928, issued Feb. 20, 1990.

This invention relates generally to abrasive blasting mechanisms and more particularly to valve systems associated therewith.

The application of pressurized material such as gas or liquid (sometimes referred to as medium) is well known and has been used for well over a century for such things as the removal of damaged paint and other coatings, removal of rust, impregnation of chemicals into substrates, cutting of substrates and the conveying of selected materials for a broad variety of purposes.

Basically, the application requires a medium or a medium which is mixed with a selected material (sometimes referred to as media) to be conveyed under pressure. The medium or a mixture of the medium and selected media (such as a chemical or abrasive particles) can be used to treat, cut or abrade a surface or target.

This basic approach has not changed since its inception more than a century ago; however, the surfaces or substrates to which the applications may apply have changed drastically. There now are topcoats and underlying substrates, such as plastics, composites, thin or exotic metals and other surfaces, where this technology can be used in a beneficial manner. These new surfaces or substrates require the exercise of a great deal of care and skill to preclude damaging the surface, substrate or other target.

Because of the care that must be taken, many inventions have focused on providing a handle which gives the operator greater mechanical control of the blasting head. These include U.S. Pat. No. 3,069,812, entitled "Sand Blasting Nozzle" issued Dec. 25, 1962, to Shelton-V; and U.S. Pat. No. 2,369,576, entitled "Blast Gun" issued Feb. 13, 1945, to Keefer.

In both of these situations, the handle provides for fixed mechanical control of the blast hose. The handle is attached to the end of the hose and extends downward in a "pistol grip" arrangement.

Although this does provide for good positive relationship between the operator's movement and the nozzle of the hose, the natural torque of the hose, accentuated due to the pressurization process, forces the operator to constantly "fight" or strain against the hose torque. This accelerates the operator fatigue problem and reduces the operator's responsiveness to variations in substrates or changes in target conditions. This can cause damage to the substrate or target.

Substrate material changes are very common in the modern world. A coated material that may appear to be of a common composition may have underlying areas of dissimilar material interposed throughout, and which are masked by a coating. A pressurized application of a medium or a mixture of medium and media that works well on one target can cause damage when applied to other surfaces, substrates or targets.

To compensate for this, several advancements in the technology have tried to place the mixing of the material at the handle. These advancements include U.S. Pat. No. 4,628,644, entitled "Abrasive Material Spraying Apparatus" issued Dec. 16, 1986, to Somers; U.S. Pat. No. 2,526,403, entitled "Abrasive Gun" issued Oct. 17, 1950, to Paasche; and U.S. Pat. No. 2,577,465, entitled "Sand Blast Gun" issued Dec. 4, 1951, to Jones et al.

In all of these applications, the added weight of the sand, abrasive material or other material to be applied causes even further operator fatigue since this weight must be swept and moved with the head of the pressurized hose.

In a commercial setting, these solutions are inoperable since the mass of material to be applied is so great that the operator could not physically move it. When a more manageable amount is placed at the spray head, the operator is forced to constantly stop and refill. This significantly handicaps the work throughput.

Another major concern related to the conveyance of medium or a mixture of medium and media under pressure is the safety issue. Operating a high pressure hose is very dangerous. Should something go wrong with the system or should even a minor accident occur such as an operator stumbling, the released pressure hose can cause damage to products and facilities as well as injure personnel.

Because of this, deadman switches were developed, such as those described in U.S. Pat. No. 2,837,874, entitled "Sand Blasting Apparatus" issued June 10, 1958, to Hunter; or U.S. Pat. No. 2,753,664, entitled "Abrasive Blasting System" issued July 10, 1956, to Garver. In both situations, the deadman switch is arranged at the handle. This is attached to the hose, and for normal operation, the operator depresses the deadman switch. When the switch is depressed, the hose is pressurized and works normally. When the operator releases the switch, either intentionally or unintentionally, the hose cannot be pressurized. This eliminates the possibility of the hose being released from the operator's grasp while still being pressurized.

As with the aforementioned pistol grip, the deadman switch forces the operator to maintain a fixed grip on the hose. This also forces the operator to fight the naturally occurring and significant torque, producing operator fatigue. Because of the fatiguing nature of the work, the operator cannot operate efficiently and therefore must take numerous breaks.

Another important hinderance to the abrasive blasting, and particularly to the plastic media blasting, is the valve systems used to control the mixing of the abrasive material with the pressurized air flow. This control function takes on two different and distinct operations: (i) control of the pressurization of the hose when the deadman's switch is activated/ deactivated; and, (ii) control of the amount of abrasive material deposited in the pressurized air flow.

Control of both is critical, especially for delicate and more modern substrates. Because of the importance of control, several patents have attempted to address this issue.

One such device is described in U.S. Pat. No. 4,075,789, entitled "Abrasive Blast System Having a Modulation Function" issued Feb. 28, 1978, to Dremann. The Dremann device utilizes a pressurized tank for holding the abrasive media and a series of pneumatic valves to control the mixing operation. The valves used are extremely complex and delicate to operate, forcing the operator to adjust them at the site of the pressurized tank. Due to the valve's complexity, the cost of construction is high.

Other devices developed for this application have suffered from the same complex nature. This includes:

U.S. Pat. No. 3,893,262, entitled "Particulate Transfer Control Device" issued July 8, 1975, to Giese; U.S. Pat. No. 3,141,264, entitled "Blasting with Abrasive Particles" issued July 21, 1964, to Moore; and U.S. Pat. No. 4,534,139, entitled "Sandblaster" issued Aug. 13, 1985, to Desjardins.

Complexity of the valve mechanism forces the cost of the resulting abrasive system to rise and also to be more susceptible to malfunctions which can be life threatening.

It is clear from the forgoing that an efficient handle and pressure application system does not exist which permits: (i) the optimal use of a pressurized hose system and (ii) allows proper control of pressurized hose systems to address the various topcoats, substrates and other targets encountered.

SUMMARY OF THE INVENTION

The present invention provides for greater control by the operator of the flow of abrasive media through the use of a unique valve system.

A pinch valve, acting in conjunction with a regulatory valve, is activated by a deadman switch. The pinch valve releases the abrasive media only when a shut-off valve is open and pressurizing the blast hose.

The media passes through the pinch valve to a remotely controlled regulatory valve. This regulatory valve controls the amount of abrasive media which enters the blast hose. A key to this invention is the ability to control the regulatory valve system both from the blast handle or from a station control panel located at the blasting generator.

The operator control panel is housed in the blast hose's handle which rotates freely around the pressure hose. This permits the hose's natural torque to be expended in twisting the hose, rather then transfering the torque to the operator.

An added feature of the operator's handle is that it has a "reverse angle" grip, which forms an acute angle (less than ninety degrees) with the nozzle of the hose. This reverse angle permits the operator to rest the hose on his/her shoulder and to comfortably hold the handle while maintaining the weight of the hose with the operator's leg muscles.

Still another feature of the invention is its incorporation of a control panel in the operator's handle itself. This control panel permits the operator to selectively adjust, among other characteristics: (i) the pressure of the carrier medium (i.e. gas or liquid); or (ii) the mixture ratio of the medium and media (e.g. the number of abrasive particles per volume of air in an abrasive blasting application).

Although the discussion of this invention relates to the field of blasting, and, in particular, to particle blasting, the invention is not to be so limited. The invention has applications to such diverse applications as fire fighting hoses, insecticide spraying, paint spraying, high viscosity coating applications or high pressure cutting applications. Those of ordinary skill in the art readily recognize other areas where the advantages of the invention can be utilized.

In this context, blasting mechanisms may be of the many known to those skilled in the art, such as those described by U.S. Pat. No. 4,333,277, entitled "Combination Sand-Blasting and Vacuum Apparatus" issued June 8, 1982, to Tasedan; U.S. Pat. No. 4,045,915, entitled "Portable Sandblaster" issued Sept. 6, 1977, to Gilbert et al.; or U.S. Pat. No. 3,858,358, entitled "High Pressure Liquid and Abrasive Cleaning Apparatus" issued Jan. 7, 1975, to Stachowiak et al. Both patents are incorporated hereinto by reference.

One of the important features of the present invention is the creation of a "floating" or freely rotatable handle. This ability to rotate permits the torque of the hose to be harmlessly expended without affecting the operator. In fact, in most situations, the twisting of the hose due to the torque goes totally without notice on the part of the operator.

This rotational ability eliminates a major portion of the strain put upon the operator during normal operation of a blasting mechanism.

Numerous embodiments of this feature of the invention exist, including a simple sleeve being mounted over the pressure or blasting hose. The inside diameter of the sleeve must be greater than the outside diameter of the pressure hose.

During pressurization of the hose, there is a natural tendency of the hose to withdraw. To maintain the pressure hose's relative position and to secure the "floating" operator's handle, a stop at the nozzle end of the hose presses against the operator's handle. In the preferred embodiment of this invention, this stop is simply the nozzle of the pressure hose, such as described in U.S. Pat. No. 2,332,407, entitled "Nozzle Used for Sand Blasting Purposes", issued Oct. 19, 1943, to Spenle, incorporated hereinto by reference.

Other nozzles are obvious to those of ordinary skill in the art. The only qualification on the stop is that it is securely attached to the pressure hose and is not permitted to travel in a longitudinal manner along the hose.

Another feature of the present invention is the use of a reverse angle grip. This is a grip that forms an angle relative to the nozzle end of the hose of less than ninety degrees. In the preferred embodiment, this angle is twenty-seven degrees, but those of ordinary skill in the art recognize that other angles are also suitable.

The advantage of the reverse angle is that it permits, whereas a right angle or an obtuse angle precludes, the possibility of an operator carrying a pressure hose over his/her shoulder during operation. This shouldering ability is very important since it places the burden of supporting the heavy blast hose upon the operator's leg muscles. Otherwise, as is the current practice, the hose is cradled in the arms of the operator. Supporting the pressure hose with the arms causes excessive fatigue, whereas the shoulder carry utilizes the leg muscles for support and creates only minimal fatigue upon the operator.

The reverse angle, when combined with the rotation characteristic of the invention, also permits the operator to rotate the handle to place the operator's grip on the top of the handle, allowing waist height use of the pressure hose. Since the operator can choose and alternate between the shoulder carry and the waist high carry, fatigue is even further reduced.

Another important feature of the present invention is its incorporation of a control panel in the operator's handle. This permits the operator to adjust various parameters of a pressure system to accommodate different surfaces, substrates and targets.

Different substrate topcoats, substrates and even substrates of identical material but with varying thickness and age, require differing pressures and media mixture for optimum application. This may be due to the tenacity of the topcoat or changes in the substrates' chemical compositions, hardness, age, weathering background and other factors. It is highly desirable that pressure, media mixture ratios and other pressure application variables be adjusted quickly and precisely at the blast head to preclude damage to substrates and other targets. This is of special importance in the removal of coatings from aircraft airframes, aerospace components and other sensitive substrates, such as advanced composites.

The operator, using his/her normal vision inspection or pressure monitoring devices while performing the pressure system application, can determine if the pressure is appropriate. Through easy manipulation of the control panel in the operator handle, the operator can adjust the pressure up or down until the optimum pressure is achieved.

This ability was not previously available. In order to adjust the pressure in the current art, the entire pressurized system had to be shut down for the operator to adjust it; alternatively, a second operator had to adjust the pressure at the blast generator. In either approach, errors could be precipitated which could damage the substrate or target.

Additionally, because of the proximity of the operator to the actual work being done (i.e. the target) or through monitoring devices, the operator can readily determine if enough media is being used. With the present invention, should the particular target require a higher or lower medium/media mixture ratio, the operator, while still blasting, can minutely adjust the ratio using the control in the pressure hose handle until the optimum ratio is obtained.

In one embodiment of the invention, the actual volume and pressure being delivered from an air compressor is controlled by the operator control panel. This is achieved by venting the output from the compressor until the desire results are obtained.

Although pressure and media mixtures are two important factors, those of ordinary skill in the art recognize that other variables associated with a pressure application operation are best controlled at the blast head. The operator's control panel in the pressure hose handle permits this.

The operator's control panel communicates with a remotely regulated valve. In the preferred embodiment of this invention, this valve is an inexpensive ball valve which is adjusted by an electric motor or pneumatic actuator. The electrical or pneumatic signal from the operator's control panel is used to manipulate the ball valve via the electric motor's or pneumatic actuator's operation.

Additionally, the remotely regulated valve is adjustable from a station control panel located proximate to the blast generator. This permits a superintendent or foreman to make minor adjustments, as well as emergency shut-offs of the media, remote from the blast site.

This dual control is important since it permits a more delicate control to be exerted upon the abrasive blasting operation.

The invention, with various of its embodiments, will be more fully explained by the accompanying drawings and their following descriptions.

DRAWINGS IN BRIEF

DRAWINGS IN DETAIL

Figure 1:
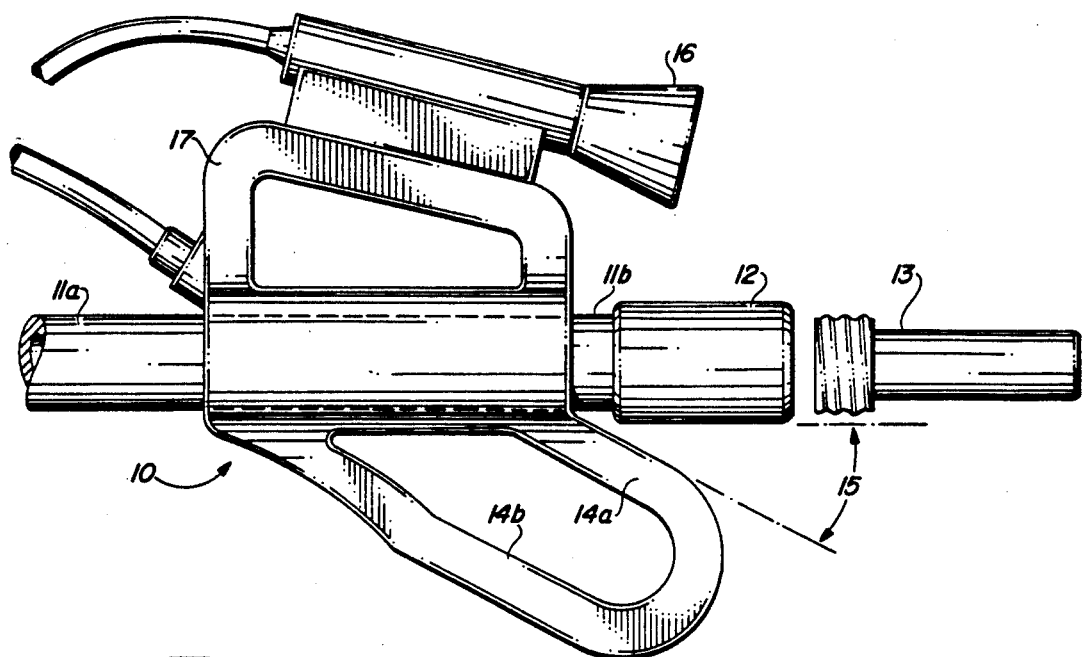
FIG. 1 is a side view of an embodiment of the operator's handle.

FIG. 1 illustrates an embodiment of the invention where the nozzle is used as the stop. Operator's handle 10 encircles pressure hose 11a. Handle 10 does not crimp or bind hose 11a permitting it to extend past the handle as illustrated by hose portion 11b. When hose 11a is pressurized, hose 11a naturally withdraws until nozzle holder/ stop 12 presses against handle 10 (not shown). At this point, the hose portion 11b ceases to be visible.

Stop 12 is a nozzle holder adapting nozzle 13 to hose 11a. In this fashion, stop 12 serves two distinct functions, it retains nozzle 13 while also maintaining the longitudinal position of handle 10 during hose pressurization.

Handle 10 additionally has a grip 14a and 14b. This grip is positioned to create a reverse angle being an acute angle illustrated by angle 15. In the preferred embodiment of this invention, angle 15 is twenty-seven degrees. Those of ordinary skill in the art readily recognize other angles which are equally acceptable for this application.

Another grip 17, on the top of the handle, is designed to permit the operator to move the hose by dragging it behind him. This grip 17 is used primarily when the hose is being hauled to a new location before pressurized applications are to commence.

The grip 17 also provides a mounting surface for a high intensity light source 16. The angle provided by grip 17 directs the light onto the target area in front of nozzle 13.

For application, hose 11a is rested upon the operator's shoulder. The operator grips either grip 14a or 14b to maintain and control the direction of the nozzle 13.

Because of the swivel nature of handle 10, it can also be rotated 180 degrees. This places grip 14a and 14b at the "top" of the pressure hose and permits the operator to use grips 14a and 14b for waist high blasting.

The operator's handle of FIG. 1 is permitted to "float" freely around the pressure hose yet provides for the positive movement necessary for pressurized operations. The floating ability and the reverse angle grip both contribute to reducing operator fatigue. A less fatigued operator can more accurately control the nozzle, is less likely to create an accident, is less likely to inadvertently harm the target and can work longer periods without breaks.

Figure 2:
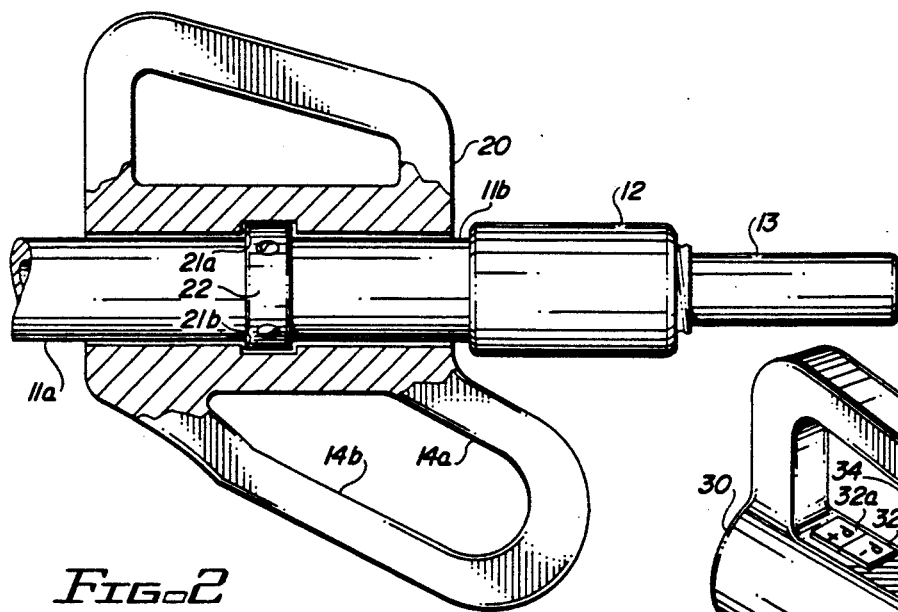
FIG. 2 is a cut-away view of a second embodiment of the operator's handle.

FIG. 2 illustrates a cutaway view of another embodiment of the invention. Handle 20 has a reverse angle grip 14a and 14b. Nozzle 13 is attached to hose 11a by attachment 12. In this embodiment of the invention, the stop function is provided by ring 22 which fits into an internal groove 21a and 21b.

In this embodiment of the invention, the hose extension illustrated by 11b can be fixed or eliminated, even during pressurization of the hose, since the stop ring 22 does not permit the hose to be withdrawn.

Ring 22 is rigidly attached to hose 11a and is not bound or crimped by the handle 20. Again, free rotation of handle 20 around hose 11a is permitted.

Since the operator's handle can be placed at any location along pressure hose 11a, this embodiment is especially useful when placement of the handle at the end of the pressure hose is not desired. One such example would be the use of nozzle 13 in a confined area which otherwise would not be accessible should the handle be proximate to the nozzle.

Figure 3:
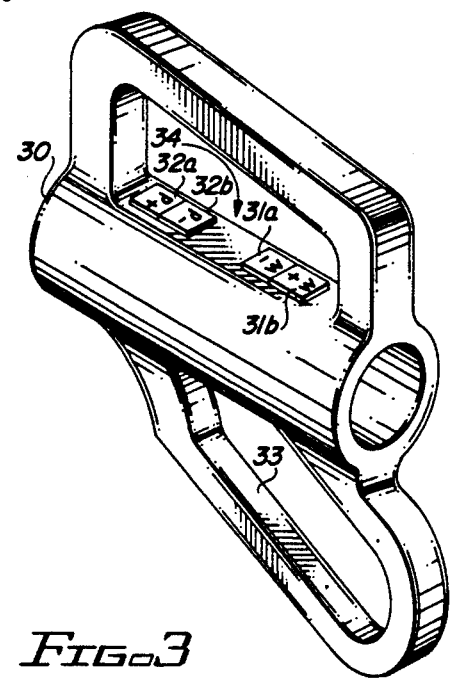
FIG. 3 is a pictorial view of an embodiment of the operator's handle illustrating the control panel and deadman switch.

FIG. 3 is a pictorial view of an embodiment of the invention illustrating the deadman switch and the operator control panel.

As described earlier, the purpose of the deadman switch is to eliminate the pressure within the hose when the operator has finished a task or is no longer in control of the handle. Because of this, the deadman switch 33 is located on the reverse angle grip 35. It is the reverse angle grip 35 that is held by the operator during normal over-the-shoulder operation and when the handle is swiveled to the top position for waist height application.

While the hose is directed via handle 35, the operator's free hand can easily manipulate the operator control panel 34. In this embodiment, operator control panel 34 contains two types of controls. Medium pressure may be increased or decreased by switches 32a and 32b, respectively. The density or ratio of media going through the hose is increased or decreased by switches 31a and 31b, respectively. Those of ordinary skill in the art readily recognize other types of control which are also applicable.

In one embodiment of the invention, the switches 31a, 31b, 32a and 32b, are electrical switches which communicate to a controller either by hard wires or by radio signals. Another embodiment of the invention utilizes a pneumatic system where the switches 31a, 31b, 32a and 32b adjust pneumatic pressure to control the remote valves.

In either case, the operator control panel 34 permits the operator, with one hand, to minutely adjust application parameters. This capability, previously not available, greatly enhances pressure hose applications. Through visual feedback from a target, the operator can perceive the effects of his/her actions and can take immediate steps to optimize such effects on a target. Alternatively, the operator, using monitoring devices (e.g. digital readouts), can make adjustments to conform to predetermined blasting parameters required by certain target conditions, such as type of coating or nature of substrate.

Figure 4:
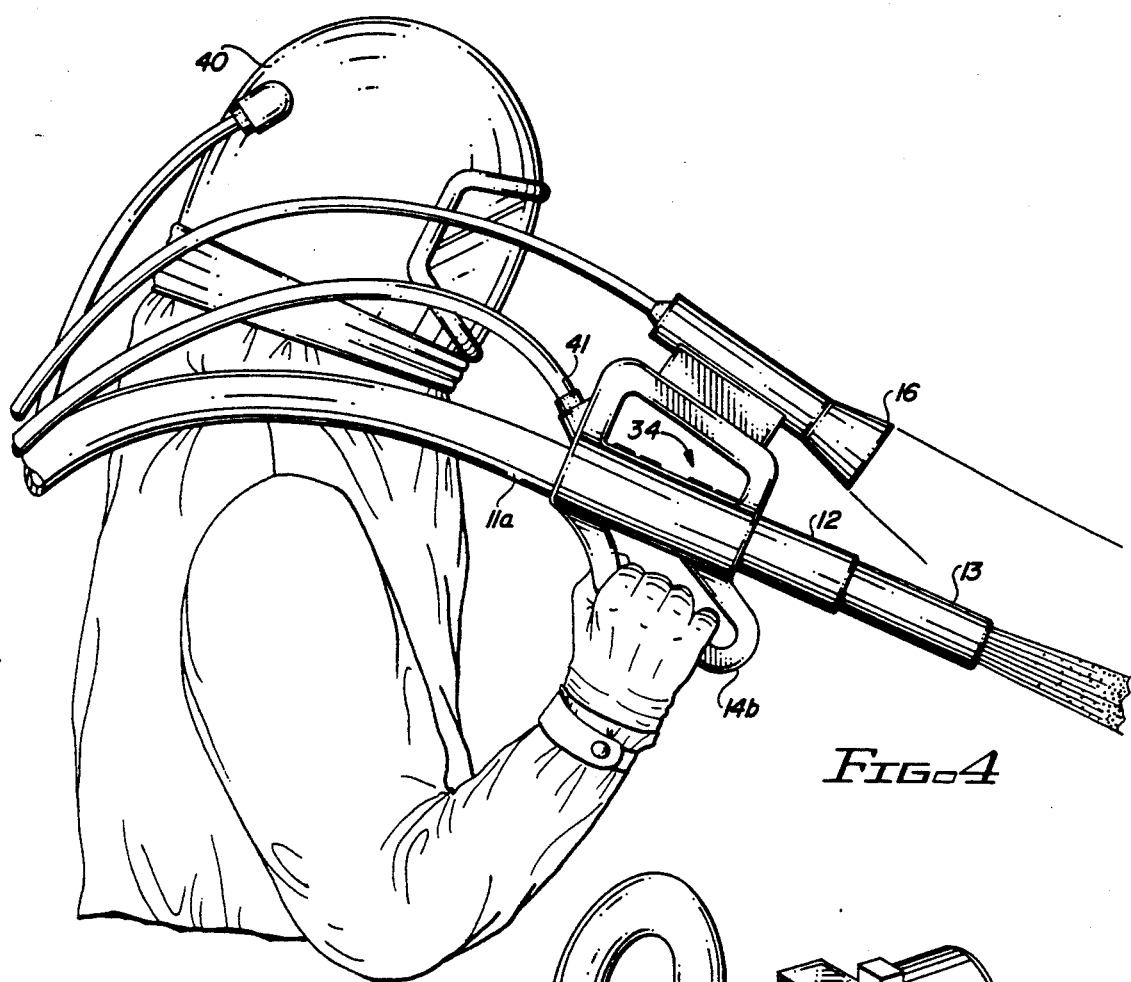
FIG. 4 is a side view of an embodiment of the invention in use.

FIG. 4 pictorially illustrates an embodiment of the invention in use. Operator 40 carries the pressure blast hose 11a over his/her shoulder and is controlling the direction of application with one hand via grip 14b.

Since the other hand is free, it can manipulate the operator control panel 34 to obtain optimum application. The signal or data from the operator control panel (whether electrical or pneumatic) are communicated via cable 41 to the servo mechanisms or other devices (not shown) which make the appropriate adjustments.

Cable 41 also carries the signal from the deadman switch on grip 14b (not shown).

The pressurized media from nozzle 13 strikes the target which is illuminated by light 16.

In this manner, the operator, with minimal physical exertion, controls all operating parameters at the nozzle head.

Figure 5:
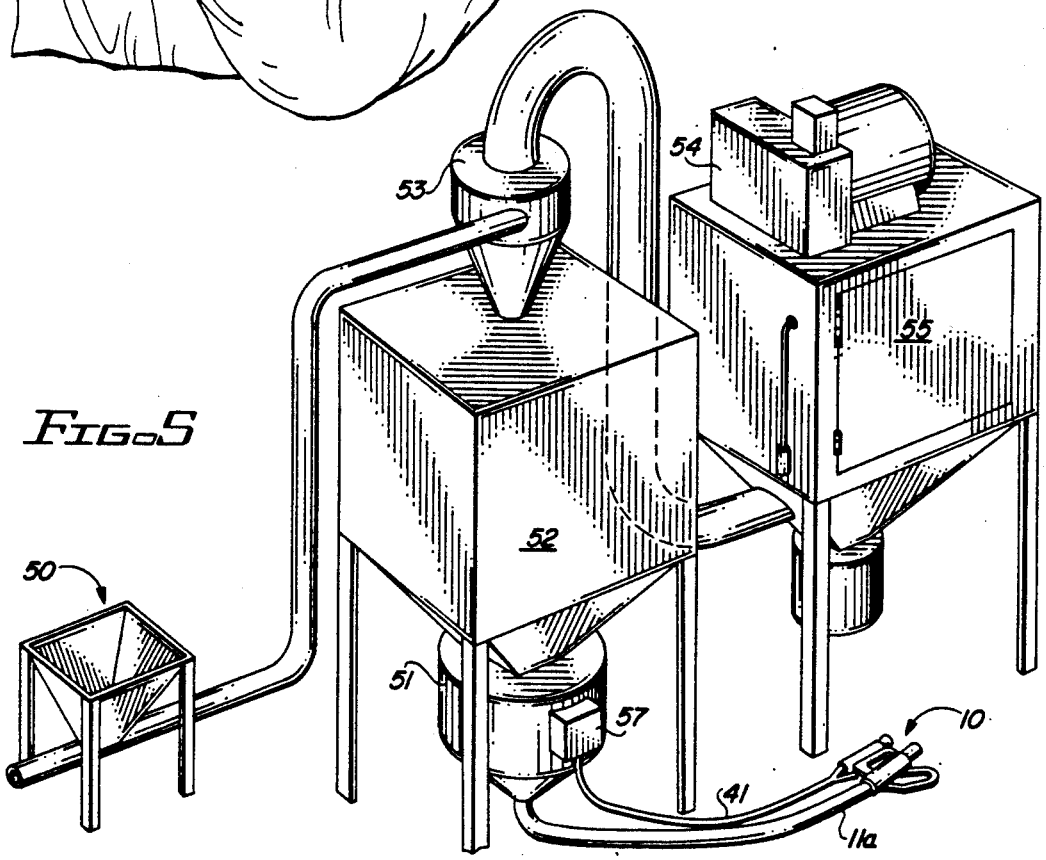
FIG. 5 is a pictorial layout of an embodiment of the invention as used in a blasting environment.

FIG. 5 is a pictorial representation of an embodiment of the present invention for a media blasting system.

In this embodiment of the invention, the controls in the operator's handle 10 sends signals to the control mechanism 57 through communication line 41. The control mechanism 57 controls medium pressure and medium/media ratios.

In this operation, the media for the blasting operation is loaded in collection hopper 50 from which it is conveyed by vacuum pressure fan 54 to cyclone separator 53. At cyclone separator 53, the media is separated into usable media and unusable material. The usable media goes into the media storage hopper 52.

An air compressor, not shown, provides both air to pressurize blast pot 51 and air to carry media into blast pressure hose 11a.

In this manner, an entire blasting operation is controlled from the blast handle. The operator performing the blasting operation has full and complete control over all blasting parameters.

Figure 6:
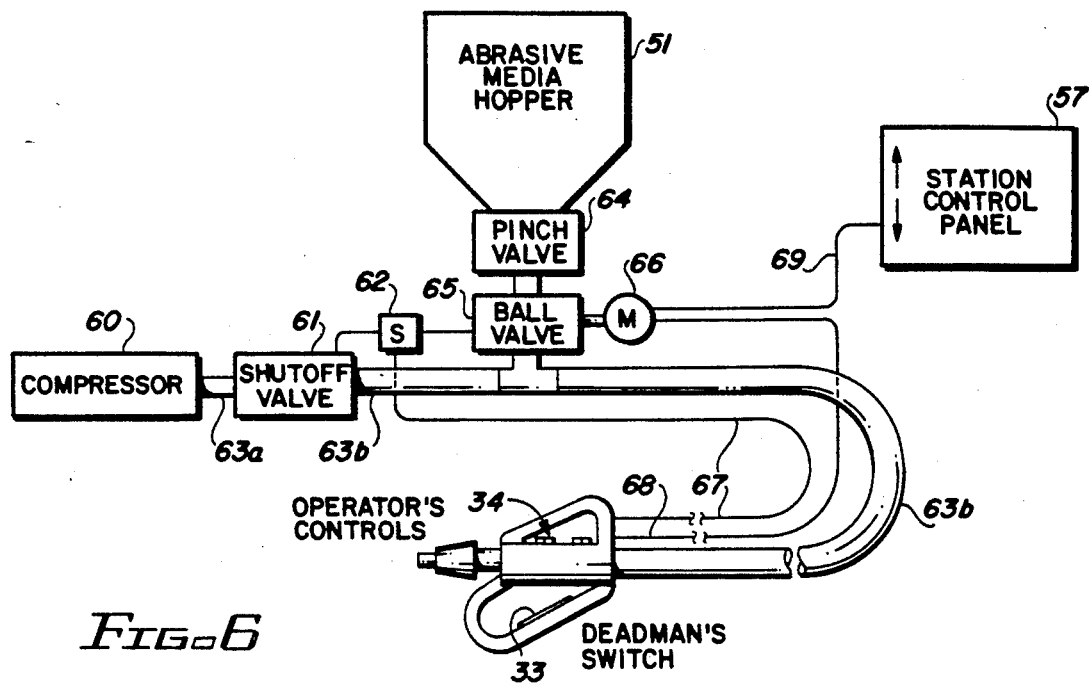
FIG. 6 is a functional diagram of an embodiment of the invention illustrating the use of the valve system.

FIG. 6 is a block diagram of an embodiment of this invention and illustrates the operation of the valve system.

Air compressor 60 creates a pressurized air flow which is restrained within hose 63a. Interposed in hose 63 is a shut-off valve 61 which, when closed, effectively depressurizes hose 63b.

Abrasive media, such as plastic particles, are staged for use in the blast generator 51. Blast generator 51 communicates the abrasive media to pinch valve 64. The sole function of pinch valve 64 is to act in conjunction with shut-off valve 61. When shut-off valve 61 has depressurized hose 63b, pinch valve 64 stops the flow of abrasive media into the system. This prevents "bleeding" of media from the blast generator 51 into the blast hose 63, a cause of sputterning and surging of the media at the blast nozzle upon repressurization of the blast hose.

Those of ordinary skill in the art readily recognize various pinch valves which are acceptable for this application. One such valve is described in U.S. Pat. No. 4,339,897, entitled "Sandblasting Methods and Apparatus" issued July 20, 1982, to Thompson et al.

In this embodiment of the invention, ball valve 65 adjusts the amount of flow of abrasive media through pinch valve 64. This adjustment is accomplished remotely through the use of electric motor 66 which is directed in its operation by either station control panel 57 or the operator control panel 34.

In this connection, it is important to note that a ball valve would not normally be used in a situation when the abrasive media used is sand or other hard abrasives sinch such abrasives would destroy the ball valve in short order. However, when the media used is comprised of plastic particles or other soft media which do not harm metal, the ball valve is an inexpensive and useful device. Those of ordinary skill in the art readily recognize other valuves which can be utilized in this context.

The ability to adjust the abrasive media flow from either the blast site (by the operator) or at the blast generator (by a foreman) is important since it permits greater freedom of control and thereby permits the system to be used on a wider variety of modern substrates.

Shut-off valve 61 and pinch valve 64 are maintained in unison operation through the use of a solenoid 62. In this embodiment, solenoid 62 adjusts the pneumatic controls of both the shut-off valve 61 and the pinch valve 64, based upon the signals communicated by the deadmans switch.

Although the blasting system described in FIG. 6 utilizes pneumatic controls for the manipulation of the pinch valve 64 and the shut-off valve 61, those of ordinary skill in the art readily recognize other mechanisms to accomplish the same objective.

Figure 7:
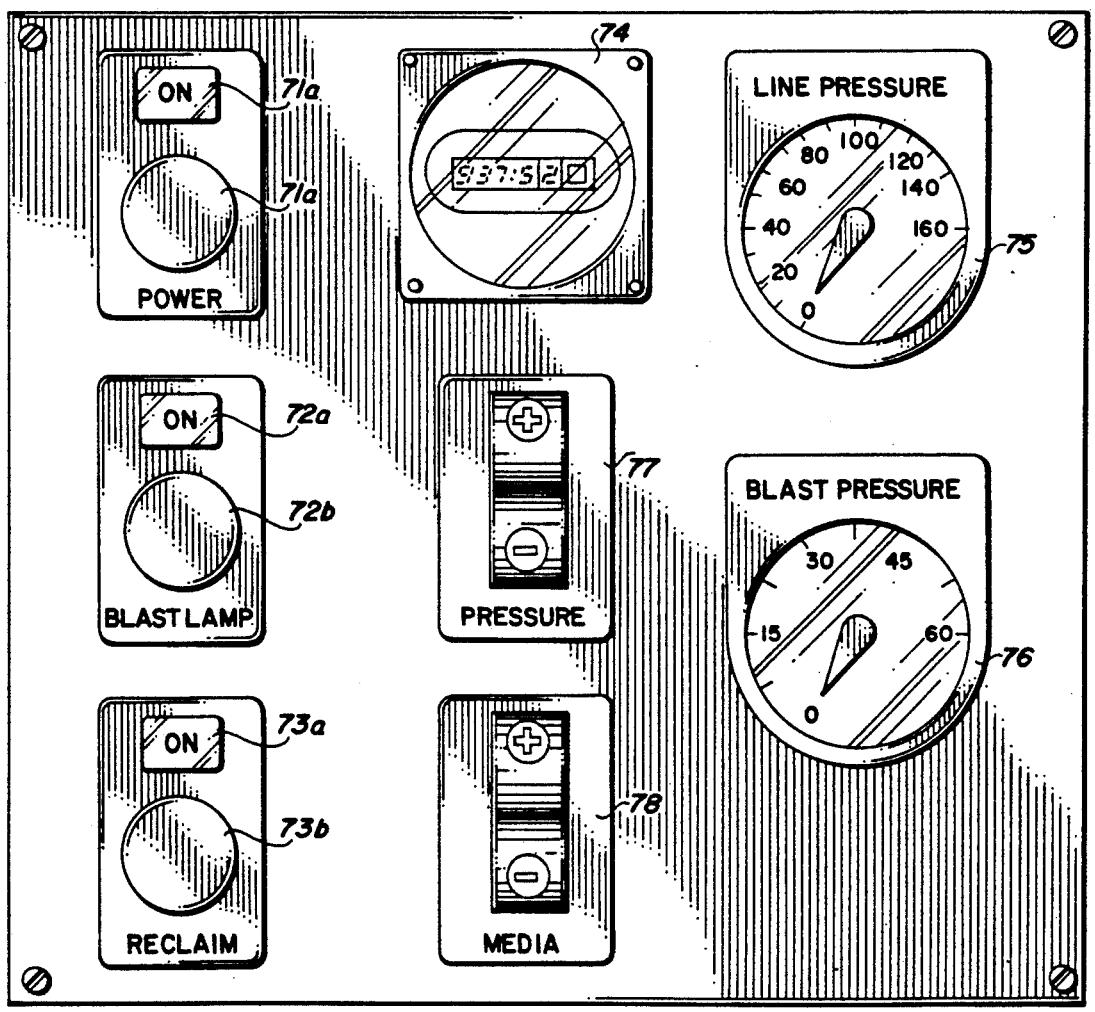
FIG. 7 is a frontal view of an embodiment of the control panel located at the site of the blast generator.

FIG. 7 is a frontal view of an embodiment of the control mechanism 57 first illustrated in FIG. 5.

In this embodiment, the operator can selectively activate the power to the system 71b, the blast lamp 72b and the reclaim mechanism 73b, and have visual feedback via "on" lamps 71a, 72a and 73a, respectively. On lamps 71a, 72a and 73a permit the operator to visually determine the status of the blast system even in a dusty environment.

Clock 74 monitors the length of time that the blast system has been operating so that proper billing and maintenance can be applied.

Pressure within the system can be increased or decreased by selective movement of pressure toggle switch 77. In a similar manner, the media flow may be increased or decreased by toggle switch 78.

Analog monitors permit accurate measurement and monitoring of the line pressure 75 and the blast pressure 76. Activation, for example, of the pressure toggle switch 77 will affect the line pressure and be reflected on the line pressure gauge 75.

It is clear from the forgoing that the present invention creates a unique device permitting blasting or pressurized application of both medium and media in a manner heretofore not attainable and with a degree of control that can preclude or minimize damage to sensitive substrates and other targets.

What is claimed is:

1. A media mixing valve system for an abrasive blasting system, said media mixing valve system comprising:
   (a) a remotely regulated valve for the selective delivery of abrasive media to a pressurized air stream and wherein said remotely regulated valve is activatable by a station control panel and an operator control panel; and,
   (b) a pinch valve for blocking access of the abrasive media from a blast generator to said remotely regulated valve.

2. The media mixing valve system according to claim 1, wherein said pinch valve is responsive to a deadman switch.

3. The media mixing valve system according to claim 2 wherein said remotely regulated valve includes a ball valve activated by an electric motor.

4. The media mixing valve system according to claim 3 further including a shut-off valve for depressurization of the system and a pneumatic solenoid for simultaneous activation of said pinch valve and said shut-off valve.

5. An abrasive blasting system comprising:
   (a) a blast generator for staging of media;
   (b) an air pressurization system;
   (c) a blasting hose having a handle for operator manipulation of said blasting hose, said handle further having a deadman switch;
   (d) delivery means for transport of pressurized air from the air pressurization system to said blasting hose;
   (e) shut-off means being responsive to said deadman switch for depressurization of said delivery means;
   (f) media mixing means for communicating media from said blast generator to said delivery means, said media mixing means having,
      (1) a remotely regulated valve for the selective delivery of the media to said delivery means, and,
      (2) a pinch valve for blocking access of the media from said blast generator to said remotely regulated valve, said pinch valve being responsive to said deadman switch;
   (g) a station control panel located in the proximity of said blast generator, said station control panel having means for manipulation of said remotely regulated valve; and,
   (h) an operator control panel located on the handle of said blasting hose, said operator control panel having means for manipulation of said remotely regulated valve.

6. The abrasive blasting system according to claim 5 wherein said remotely regulated valve includes a ball valve activated by an electric motor.

7. The abrasive blasting system according to claim 6 further comprising a pneumatic solenoid and wherein said pneumatic solenoid simultaneously activates said pinch valve and said shut-off means based upon signals from said deadman switch.

8. A plastic media blasting system comprising:
   (a) a blast generator for staging of a plastic media;
   (b) an air pressurization system;
   (c) a blasting hose having a handle for operator manipulation of said blasting hose, said handle further having a deadman switch;
   (d) delivery means for transport of pressurized air from the air pressurization system to said blasting hose;
   (e) shut-off means being responsive to said deadman switch for depressurization of said delivery means;
   (f) media mixing means for communicating plastic media from said blast generator to said delivery means, said media mixing means having,
      (1) a remotely regulated valve for the selective delivery of the plastic media to said delivery means, and,
      (2) a pinch valve for blocking access of the plastic media from said blast generator to said remotely regulated valve, said pinch valve being responsive to said deadman s switch;
   (g) a station control panel located in the proximity of said blast generator, said station control panel having means for manipulation of said remotely regulated valve; and,
   (h) an operator control panel located on the handle of said blasting hose, said operator control panel having means for manipulation of said remotely regulated valve.

9. The plastic media blasting system according to claim 8 wherein said remotely regulated valve includes a ball valve manipulateable by an electric motor.

10. The plastic media blasting system according to claim 9 further comprising a pneumatic solenoid and wherein said pneumatic solenoid simultaneously activates said pinch valve and said shut-off means based upon signals from said deadman switch.

* * * * *